United States Patent [19]

Nockleby

[11] Patent Number: 5,037,008
[45] Date of Patent: Aug. 6, 1991

[54] MANUAL SEED METERING APPARATUS

[76] Inventor: Raymond B. Nockleby, 2605 S. Tomahawk Rd., Raindance Park, Apache Junction, Ariz. 85219

[21] Appl. No.: 525,909
[22] Filed: May 21, 1990
[51] Int. Cl.⁵ .............................................. G01F 11/10
[52] U.S. Cl. .................................. 222/336; 222/175; 222/404
[58] Field of Search ............... 222/175, 336, 344, 368, 222/369, 516, 518, 370, 365, 404; 111/50, 34, 72, 77, 170, 177

[56] References Cited

U.S. PATENT DOCUMENTS

| | | | |
|---|---|---|---|
| 808,588 | 12/1905 | Tracy | 222/369 |
| 1,916,781 | 7/1933 | Blatchford | 222/311 |
| 2,237,504 | 4/1941 | Roath | 111/77 |
| 2,295,380 | 9/1942 | Bland | 222/369 |
| 2,433,478 | 12/1947 | Nelson | 222/369 |
| 2,806,636 | 9/1957 | Richards | 222/368 |
| 2,986,305 | 5/1961 | Koerper et al. | 221/211 |
| 4,231,495 | 11/1980 | Lund | 222/368 |
| 4,645,064 | 2/1987 | Hayashi | 222/404 |
| 4,650,090 | 3/1987 | Orthey | 221/185 |
| 4,738,208 | 4/1988 | Nockleby | 111/72 |

FOREIGN PATENT DOCUMENTS

| | | | |
|---|---|---|---|
| 501423 | 3/1951 | Belgium | 222/175 |
| 915389 | 7/1946 | France | 22/175 |

Primary Examiner—Michael S. Huppert
Assistant Examiner—Philippe Derakshani
Attorney, Agent, or Firm—Henderson & Sturm

[57] ABSTRACT

A manual seed metering apparatus (10) for dispensing discrete amounts of seed (100) from a seed reservoir (18) defined by a housing member (14) by virtue of the spring loaded rotary and reciprocatory movement of a seed paddle unit (12) disposed within the housing member (14) and controlled by a crank handle member (50).

4 Claims, 1 Drawing Sheet

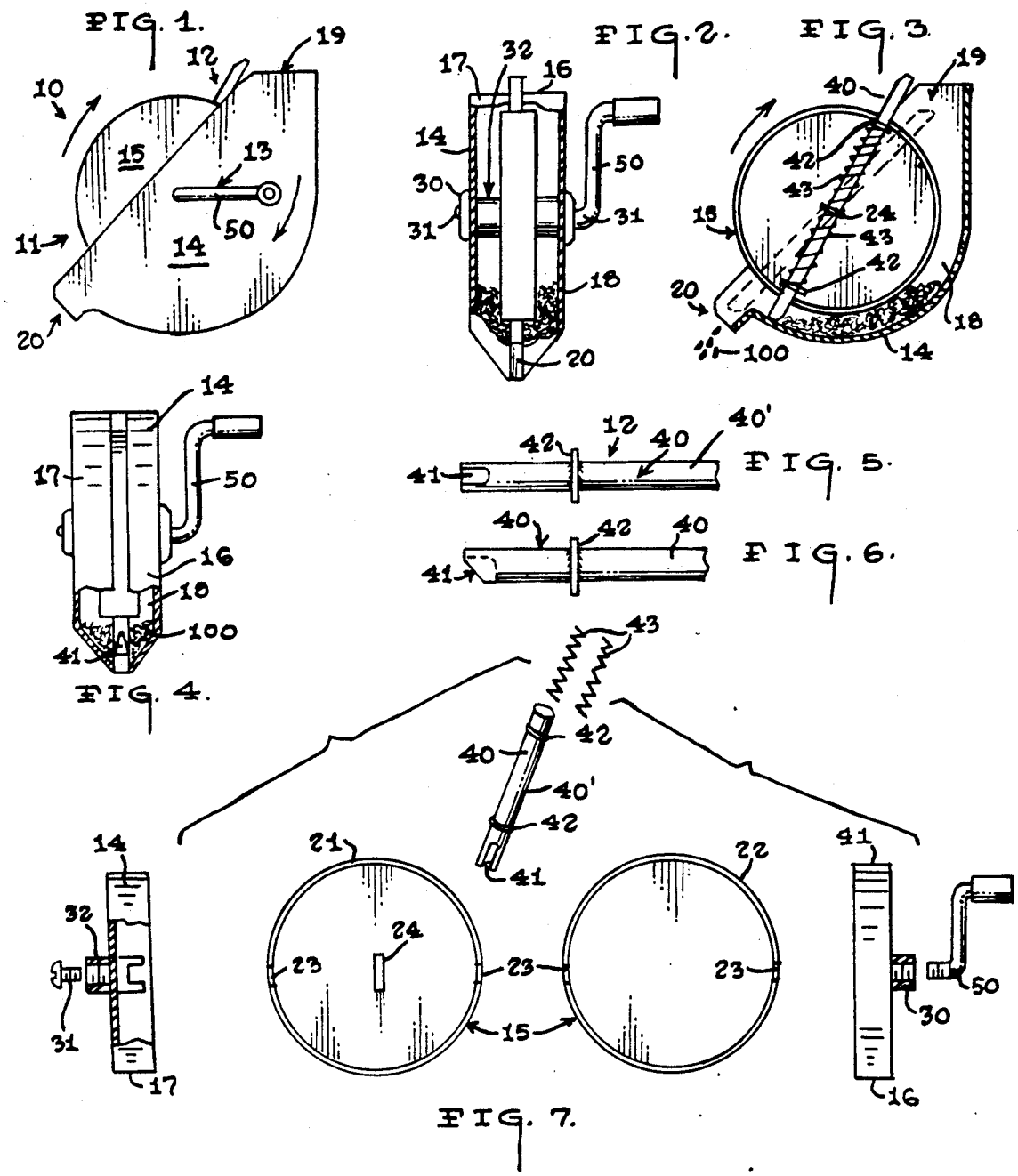

MANUAL SEED METERING APPARATUS

TECHNICAL FIELD

The present invention relates to the field of seed dispensing devices in general, and in particular to a manual seed metering device for dispensing discrete amounts of seed.

BACKGROUND ART

As can be seen by reference to the following U.S. Pat. Nos. 1,916,781; 2,986,305; 4,650,090; and 4,738,208; the prior art is replete with myriad and diverse seed metering devices.

While all of the aforementioned prior art constructions are more than adequate for the basic purpose and function for which they have been specifically designed, these devices have also been plagued by the common malady of being over-engineered in that they employ far too many structural components to accomplish what must be considered a relatively simple and straightforward task. In addition, the structural complexity of these devices not only increases the cost to the consumer, but also substantially increases the likelihood of a structural component failure which would render the device inoperable.

As a consequence of the foregoing situation, there has existed a longstanding need for a simply constructed manual seed metering apparatus that is inexpensive and easy to operate and one which will deliver discrete amounts of seed twice during each complete revolution of the apparatus handle and the provision of such a construction is a stated objective of the present invention.

DISCLOSURE OF THE INVENTION

Briefly stated, the manual seed metering apparatus that forms the basis of the present invention comprises a housing unit, a seed paddle unit, and a handle actuator unit.

The housing unit comprises a two-piece housing member which defines a seed reservoir chamber and has a seed dispensing outlet formed on one portion and a seed filling inlet formed on another portion.

The seed paddle unit comprises a spring loaded paddle arm member which is mounted for both rotation and reciprocation relative to the housing unit. The handle actuator unit comprises a handle member which imparts the rotary movement of the paddle arm member with respect to the housing unit.

As will be explained in greater detail further on in the specification, the two-piece housing member comprises an outer housing member and an inner housing member wherein the inner housing member is rotatably disposed relative to the outer housing unit and captively engages the spring loaded paddle arm members such that the shaft of the paddle arm member will reciprocate within the inner housing member.

As the paddle arm member rotates relative to the outer housing member, one end of the paddle arm member will normally be in close frictional contact with the interior wall of the outer housing member to dispense a discrete amount of seed from the seed reservoir with each passage of one of the ends of the paddle arm member through the seed reservoir.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a side elevation view of the seed metering apparatus;

FIG. 2 is a partial cross-sectional front view of the apparatus;

FIG. 3 is a cross-sectional front view of the apparatus;

FIG. 4 is another partial cross-sectional front view of the apparatus;

FIG. 5 is an enlarged top view of one end of the paddle arm member;

FIG. 6 is an enlarged side view of the end of the paddle arm member; and,

FIG. 7 is an exploded perspective view of the inner housing member.

BEST MODE FOR CARRYING OUT THE INVENTION

As can be seen by reference to the drawings, and in particular to FIG. 1, the manual seed metering apparatus that forms the basis of the present invention is designated generally by the reference numeral (10). The apparatus (10) comprises in general: a housing unit (11), a seed paddle unit (12) and a handle actuator unit (13). These units will now be described in seriatim fashion.

As can best be seen by reference to FIGS. 1 through 3, and 7, the housing unit (11) comprises an outer housing member (14) and an inner housing member (15) wherein the inner housing member (15) is rotatably disposed relative to the outer housing member (14).

The outer housing member (14) comprises two complementary outer housing segments (16, 17) which cooperate to define an enlarged interior seed reservoir (18) having a seed inlet opening (19) on the upper end of the seed reservoir (18) and a seed discharge spout (20) on the lower end of the seed reservoir (18).

The inner housing member (15) comprises two complementary shallow cylindrical inner housing segments (21, 22) which form a hollow disk dimensioned to receive a portion of the seed paddle unit (12) as will be explained in greater detail further on in the specification.

Turning now particularly to FIG. 2, it can be seen that an axle and hub assembly (30) forms the operative connection between the inner and outer housing members (15, 14) wherein the inner housing member (15) is rotatably disposed relative to the outer housing member (14).

In the preferred embodiment depicted in FIG. 2, the axle and hub assembly (30) comprises the shank of handle (50) and bolt (31) while the inner housing member (15) is provided with a pair of hubs (32) which receive the axles (31) in a well recognized fashion. It should also be noted that any suitable axle and hub assembly (30) may be substituted in keeping with the teachings of this invention.

In addition, as can best be seen by reference to FIG. 7, the inner housing member (15) is further provided with a pair of aligned apertures (23) formed in the opposed walls of the inner housing segments (21, 22) wherein at least one of the housing segments (21, 22) is provided with a bearing element (24) and wherein the apertures (23) and the bearing element (24) are aligned and dimensioned to cooperate with the seed paddle unit (12) as will be explained presently.

Turning now to FIGS. 3, and 5 through 7, it can be seen that the seed paddle unit (12) comprises an elongated paddle arm member (40) having oppositely faced recessed seed scoops (41) formed on each end and a pair of spring shoulder elements (42) disposed proximate to, but spaced from, the recessed scoops (41). In addition, the paddle unit (12) includes a pair of springs (43) which are disposed along the shaft of the paddle arm member (40) intermediate the spring should elements (42).

As can best be appreciated by reference to FIGS. 3 and 7, the ends of the elongated paddle arm members (40) are dimensioned to be slidably received through the apertures (23) in the inner housing member (15) while the intermediate portion (40) of the paddle arm member (40) is dimensioned to be slidably received in the bearing element (24) on the interior portion of the inner housing member (15). In addition, the bearing element (24) is dimensioned to act as a stop element for the springs (43), whereby the paddle arm member (40) will be disposed in a spring biased reciprocating fashion relative to both the inner (15) and outer (14) housing members are depicted in FIG. 3.

As shown in FIGS. 2, 4 and 7, the actuator handle unit (13) comprises a conventional rotary crank handle member (50) which is operatively connected to the axle and hub assembly (30) to impart rotary movement of the inner housing member (15) relative to the outer housing member (14) in a well recognized fashion.

As the inner housing member (15) rotates relative to the outer housing member (14), the inner housing member (15) will be carrying the paddle arm member (40) in a 360° revolution relative to the interior of the outer housing member (14).

As one end of the paddle arm member (40) contacts the interior wall of the outer housing member (14), the spring (43) associated with at end of the paddle arm member (40) will be compressed against the bearing element (24) of the inner housing member (15) to keep the seed scoop (41) in frictional engagement with the interior wall of the outer housing member (14). The seed scoop (41) will then travel from the seed supply inlet (19) through the seed reservoir (18) collecting seeds (100) which will subsequently be dispensed through the seed outlet spout (20) whereupon the spring compression will be released. In addition, as one end of the paddle arm member (40) is being forced inwardly relative to the interior of the inner housing member (15), the travel of the other end of the paddle arm member will be limited by the engagement of the spring should element (42) with the interior of the inner housing member (15).

Having thereby described the subject matter of the present invention, it should be apparent that many substitutions and variations of the invention are possible in light of the above teachings. It is therefore to be understood that the invention as taught and described herein is only to be limited to the extent of the breadth and scope of the appended claims.

I claim:

1. A manual seed metering apparatus comprising:
  a housing unit including a first housing member defining a seed reservoir and having an upper seed inlet and a lower seed discharge spout: and, a second housing member rotatably disposed at least partially within said first housing member wherein the second housing member is provided with opposed apertures that are dimensioned to slidably receive the ends of an elongated paddle arm member;
  a seed paddle unit operatively disposed for relative rotary and reciprocatory movement with respect to said first housing member; wherein the seed paddle unit comprises said elongated paddle arm member having opposite ends and an intermediate portion; wherein oppositely faced seed scoops are formed on each end; and
  a handle unit including a crank handle member for imparting the rotary movement of the seed paddle unit relative to the said first housing member wherein the second housing member is further provided with a bearing element which is dimensioned to slidably receive the intermediate portion of the paddle arm member.

2. The apparatus as in claim 1 wherein the paddle arm member is further provided with shoulder elements which are disposed proximate to, but spaced from, the seed scoops on the ends of the paddle arm member.

3. The apparatus as in claim 2 wherein the seed paddle unit further comprises:
  a pair of springs disposed intermediate the shoulder elements on said paddle arm member.

4. The apparatus as in claim 3 wherein each spring has one end resting on a shoulder element of the paddle arm member and the other end resting on the bearing element in the second housing member.

* * * * *